US009523181B2

(12) United States Patent
Formenti et al.

(10) Patent No.: US 9,523,181 B2
(45) Date of Patent: Dec. 20, 2016

(54) DIGGING MACHINE

(71) Applicant: SAIPEM S.p.A., San Donato Milanese (IT)

(72) Inventors: Massimiliano Formenti, San Donato Milanese (IT); Alberto Serena, San Donato Milanese (IT); Mauro Bettanin, San Donato Milanese (IT)

(73) Assignee: SAIPEM S.P.A., San Donato Milanese (IT)

( * ) Notice: Subject to any disclaimer, the term of this patent is extended or adjusted under 35 U.S.C. 154(b) by 0 days.

(21) Appl. No.: 14/889,119

(22) PCT Filed: May 8, 2014

(86) PCT No.: PCT/IB2014/061308
§ 371 (c)(1),
(2) Date: Nov. 4, 2015

(87) PCT Pub. No.: WO2014/181292
PCT Pub. Date: Nov. 13, 2014

(65) Prior Publication Data
US 2016/0083928 A1    Mar. 24, 2016

(30) Foreign Application Priority Data

May 8, 2013    (IT) .............................. MI2013A0745

(51) Int. Cl.
*F16L 1/16*      (2006.01)
*E02F 5/14*      (2006.01)
(Continued)

(52) U.S. Cl.
CPC .............. *E02F 5/145* (2013.01); *E02F 5/006* (2013.01); *E02F 5/08* (2013.01); *E02F 5/104* (2013.01);
(Continued)

(58) Field of Classification Search
CPC ................ F16L 1/12; F16L 1/16; F16L 1/165; F16L 1/20
(Continued)

(56) References Cited

U.S. PATENT DOCUMENTS 2,142,136 A  *  1/1939  Lawton ................... E02F 5/104
                                                172/430
3,670,514 A  *  6/1972  Breston ................... E02F 5/105
                                                37/308

(Continued)

FOREIGN PATENT DOCUMENTS

WO    WO 2013/046184      4/2013

OTHER PUBLICATIONS

International Search Report and Written Opinion for International Application No. PCT/IB2014/061308 dated Aug. 19, 2014.
(Continued)

*Primary Examiner* — Frederick L Lagman
(74) *Attorney, Agent, or Firm* — Neal, Gerber & Eisenberg LLP

(57) ABSTRACT

A digging machine configured to bury a continuous elongated member in the bed of a body of water has a frame extending along a longitudinal axis; a guide assembly fitted to the frame to move crosswise to the longitudinal axis, and configured to engage and move along the continuous elongated member; and a control device configured to adjust the position of the guide assembly with respect to the frame and the continuous elongated member according to the conformation of the continuous elongated member.

27 Claims, 5 Drawing Sheets

(51) Int. Cl.
  *F16L 1/20* (2006.01)
  *E02F 5/10* (2006.01)
  *E02F 5/00* (2006.01)
  *E02F 5/08* (2006.01)
  *E02F 5/12* (2006.01)
  *F16L 1/235* (2006.01)

(52) U.S. Cl.
  CPC .............. *E02F 5/109* (2013.01); *E02F 5/125* (2013.01); *F16L 1/165* (2013.01); *F16L 1/20* (2013.01); *F16L 1/207* (2013.01); *F16L 1/235* (2013.01)

(58) Field of Classification Search
  USPC .................................................. 405/161, 164
  See application file for complete search history.

(56) References Cited

U.S. PATENT DOCUMENTS

| | | | | |
|---|---|---|---|---|
| 4,338,042 A | * | 7/1982 | Faldi | E02F 3/92 37/323 |
| 4,362,436 A | * | 12/1982 | Harmstorf | E02F 5/105 37/323 |
| 4,488,836 A | * | 12/1984 | Cour | E02D 17/08 405/156 |
| 4,537,530 A | * | 8/1985 | Yamamura | E02F 5/105 367/19 |
| 4,538,937 A | * | 9/1985 | Lynch | E02F 5/104 242/156 |
| 4,542,334 A | * | 9/1985 | Nelson | G01B 7/31 324/326 |
| 4,643,613 A | * | 2/1987 | Durner | E02F 5/109 405/161 |
| 4,678,371 A | * | 7/1987 | Yamamura | G01V 3/06 324/127 |
| 7,025,534 B2 | * | 4/2006 | Martin | G01V 1/38 367/15 |
| 2003/0113092 A1 | * | 6/2003 | Porter | G02B 6/506 385/147 |
| 2011/0064524 A1 | * | 3/2011 | Hazen | E02F 3/8866 405/161 |
| 2012/0121339 A1 | * | 5/2012 | Lazzarin | E02F 5/04 405/159 |
| 2012/0207546 A1 | * | 8/2012 | Stockstill | E02F 5/105 405/161 |

OTHER PUBLICATIONS

Notification Concerning Submission, Obtention or Transmittal of Priority document for International Application No. PCT/IB2014/061308 dated Sep. 4, 2014.

* cited by examiner

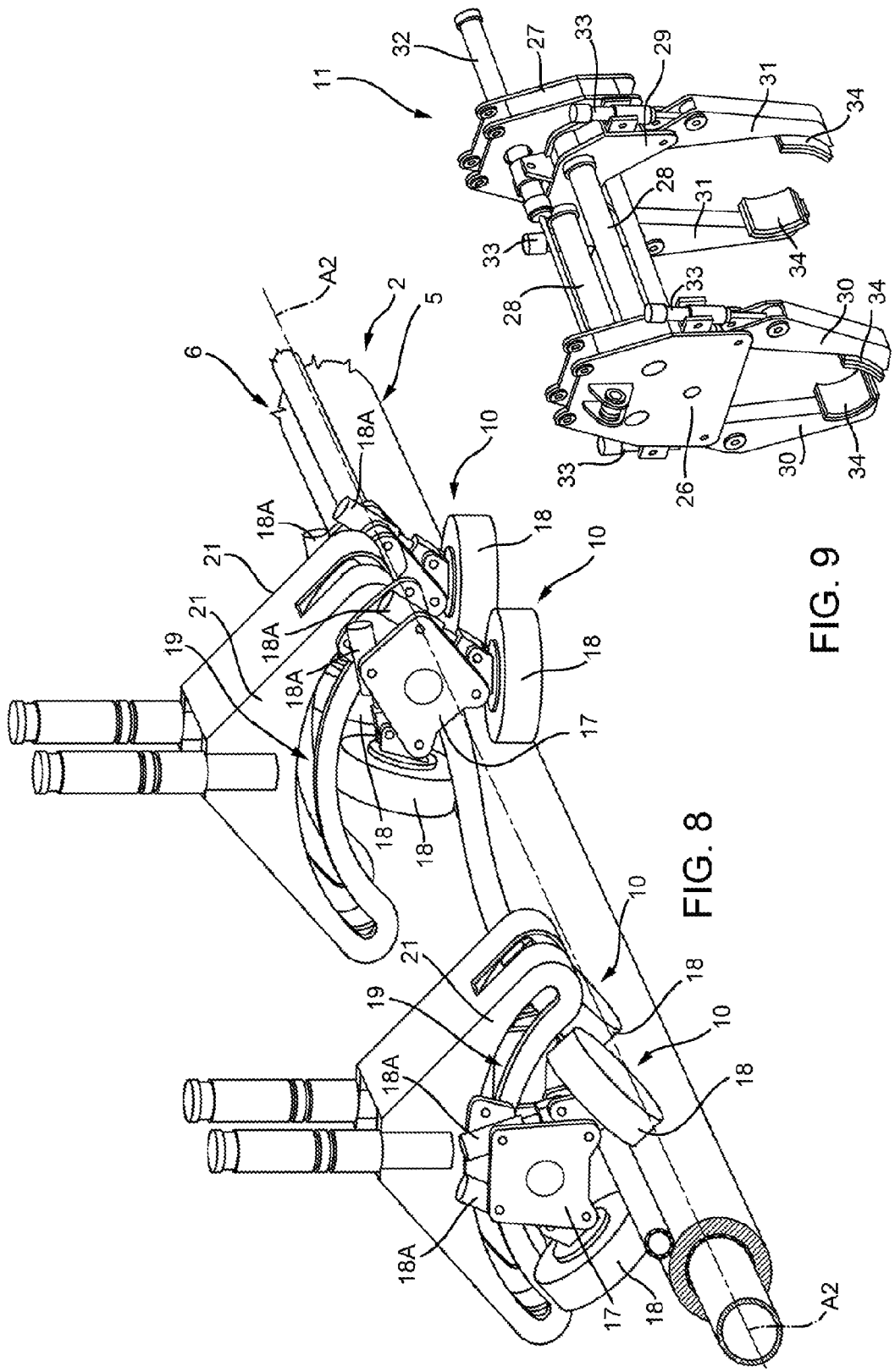

DIGGING MACHINE

PRIORITY CLAIM

This application is a national stage application of PCT/IB2014/061308, filed on May 8, 2014, which claims the benefit of and priority to Italian Patent Application No. MI2013A 000745, filed on May 8, 2013, the entire contents of which are each incorporated by reference herein.

BACKGROUND

Burying a continuous elongated member in the bed of a body of water normally comprises laying the continuous elongated member along a given path on the bed of the body of water; breaking up a mass of the bed to a given depth along the path; digging a trench or generally removing the broken-up bed mass, normally at the same time the mass is broken up; and possibly covering over the continuous elongated member.

More specifically, currently used known techniques comprise removing the broken-up bed mass to form a trench in the bed of the body of water; and lowering the continuous elongated member into the trench. The removed bed mass may subsequently be used as backfill to fill the trench and bury the continuous elongated member.

Continuous elongated members are routinely buried, either completely or partly, for various reasons: to protect them from damage by blunt objects, such as anchors or nets, close to shore approaches or in relatively shallow water; and at times to avoid severe stress by natural elements, such as wave motion and current. In the case of continuous elongated members in the form of rigid pipelines laid on the bed of the body of water, the pipeline may have unsupported tracts spanning two supporting points (i.e., in which the pipeline is detached from the bed); in which case, the pipeline is particularly exposed to, and vulnerable to movement induced by, wave motion and current. At times, burying is necessary to protect pipelines from deformation (upheaval/lateral buckling) caused by thermal instability; or to protect continuous elongated members from the bed-scouring action of ice in very shallow water.

To protect the pipeline from damage, a continuous elongated member very often need simply be laid in the bottom of a suitably deep trench dug either before (pre-trenching) or, more usually, after the continuous elongated member is laid on the bed of the body of water (post-trenching). At times, the protection afforded by the trench and by natural backfilling is not enough, and the continuous elongated member must be buried using the broken-up bed mass removed from the trench, or any available bed mass alongside the trench.

Post-trenching is advantageously performed using digging machines for which the continuous elongated member laid on the bed of the body of water acts as a guide. In other words, the continuous elongated member acts as a guide and grip rail to which the drive force to move the digging machine forward is applied.

Digging machines of this type are extremely advantageous when working with continuous elongated members in the form of rigid pipelines with a constant, regular-shaped cross section, but are limited, for example, when the continuous elongated member comprises a main pipeline, and an auxiliary, so-called 'piggyback' pipeline, the position of which with respect to the main pipeline may change over time. For practical reasons, the auxiliary pipeline is normally strapped to the main pipeline, but the straps fail to provide for a permanently rigid, stable connection. In fact, the main and auxiliary pipelines together form an irregularly-shaped continuous elongated member, the shape of which varies over time along its length, with the result that digging machines of the type described above may affect the integrity of the auxiliary pipeline.

SUMMARY

The present disclosure relates to a digging machine configured to bury a continuous elongated member in the bed of a body of water.

It is an advantage of the present disclosure to provide a digging machine configured to bury continuous elongated members in the bed of a body of water effectively and without damaging the continuous elongated member, even when this is of variable, irregular shape.

According to the present disclosure, there is provided a digging machine configured to bury a continuous elongated member in the bed of a body of water, the digging machine comprising a frame extending along a longitudinal axis; at least two guide assemblies, which are arranged successively along the longitudinal axis, are fitted to the frame to move crosswise to the longitudinal axis, and are configured to engage and move along the continuous elongated member; and a control device configured to adjust the position of the guide assemblies with respect to the frame and the continuous elongated member according to the conformation of the continuous elongated member. This way, contact between the guide assemblies and the continuous elongated member can be controlled to avoid damaging the continuous elongated member.

In certain embodiments, each guide assembly is connected to the frame by a sliding coupling which slides along a trajectory, such as an arc-shaped trajectory. This way, the contact area between each guide assembly and the continuous elongated member can be adjusted about the continuous elongated member.

In certain embodiments of the present disclosure, each guide assembly is movable with respect to the frame along a respective plane perpendicular to the longitudinal axis.

The digging machine extends mainly along the longitudinal axis, and is positioned over the continuous elongated member, with the longitudinal axis substantially parallel to the continuous elongated member. Moving each guide assembly along a respective plane perpendicular to the longitudinal axis enables the guide assembly to move substantially around the continuous elongated member.

In certain embodiments of the present disclosure, the control device comprises a control unit configured to set each guide assembly, with respect to the frame, to a plurality of positions about the continuous elongated member. In other words, the digging machine has an automatic system configured to precisely adjust the positions of the guide assemblies.

In certain embodiments, each guide assembly comprises a runner fitted slidably to the frame; and at least two setting members fitted to the runner and configured to be positioned contacting and astride the continuous elongated member. In other words, each guide assembly can be positioned contacting two separate, spaced-apart areas of the continuous elongated member to enhance the stability of the digging machine and distribute the mass of the digging machine over the continuous elongated member.

In certain embodiments, each setting member is hinged to the runner and movable selectively between a work position and a rest position. This way, each guide assembly can be positioned contacting the continuous elongated member at one contact point, two contact points, or with both setting members detached a designated or given distance from the continuous elongated member. Individual adjustment of the setting members makes it possible to overcome any obstacles along the continuous elongated member.

In certain embodiments, the control device comprises at least one sensor configured to detect signals relating to the conformation of the continuous elongated member close to a guide assembly. In other words, the control device adjusts the guide assemblies according to the detected, appropriately processed signal. The types of sensors used comprise transponder detectors connected beforehand to the continuous elongated member; feelers; and any type of sensor capable of supplying a reliable signal in a body of water with large amounts of suspended inert material thrown up by the digging machine.

In certain embodiments, the control device comprises at least two sensors configured to detect signals relating to the conformation of the continuous elongated member close to at least two respective guide assemblies. In other words, precision adjustment of the guide assemblies is greatly enhanced by providing a sensor close to each guide assembly.

In certain embodiments of the present disclosure, the digging machine comprises a drive assembly between two guide assemblies.

The guide and drive functions are separate.

In certain embodiments, the drive assembly is connected rigidly to the frame, and is a push-pull type.

In certain embodiments, the drive assembly comprises a first pair of clamps configured to selectively clamp the continuous elongated member; and a second pair of clamps configured to selectively clamp the continuous elongated member and movable along the longitudinal axis with respect to the frame; one of the first and second pairs of clamps engaging the continuous elongated member at all times. This way, the digging machine is secured to the continuous elongated member by both the guide assemblies and the drive assembly. The drive assembly prevents the digging machine from rotating about the continuous elongated member, while the guide assemblies define the supporting points on the continuous elongated member.

In certain embodiments, the drive assembly comprises gripping portions configured to grip the underside of the continuous elongated member.

The continuous elongated member normally comprises a main pipeline, and an auxiliary pipeline connected to the top of the main pipeline. Locating the gripping portions beneath the continuous elongated member avoids any interference with the auxiliary pipeline.

In certain embodiments of the present disclosure, the digging machine comprises a digging assembly in turn comprising at least two digging members located on opposite sides of the frame and tilted to dig out a mass of the bed from beneath the continuous elongated member.

To some extent, the digging assembly thus provides for further supporting and stabilizing the digging machine.

The present disclosure also relates to a method of advancing the digging machine along, and without damaging, irregular-shaped continuous elongated members.

According to the present disclosure, there is provided a method of advancing a digging machine configured to bury a continuous elongated member in the bed of a body of water, the method comprising the steps of guiding a digging machine along a continuous elongated member, laid on the bed of a body of water, using at least two guide assemblies fitted to the continuous elongated member and arranged successively along a longitudinal axis of the digging machine; acquiring signals relating to the conformation of the continuous elongated member; and adjusting the position of the guide assemblies according to the conformation of the continuous elongated member.

The digging machine is thus able to take into account the irregular shape of the continuous elongated member, to adapt the position of the guide assemblies accordingly.

In certain embodiments, the step of adjusting the position of the guide assemblies comprises the step of rotating each guide assembly about the continuous elongated member along a respective plane perpendicular to the longitudinal axis, according to the conformation of the continuous elongated member.

One of the main irregularities and unknowns of the continuous elongated member is the position of the auxiliary pipeline with respect to the main pipeline. The precise function of rotating each guide assembly is to ensure the guide assembly only contacts the main pipeline.

In certain embodiments, the step of adjusting the position of the guide assemblies comprises the step of setting each guide assembly to a work position contacting the continuous elongated member, and to a rest position a designated or given distance from the continuous elongated member.

Because the main pipeline and the auxiliary pipeline are connected by strap assemblies equally spaced along the continuous elongated member, and the auxiliary pipeline is smaller in diameter than the main pipeline, the strap assemblies constitute localized obstacles to the guide assemblies. To avoid damaging the straps, it is therefore best to set the guide assemblies to the rest position when travelling over the straps.

In certain embodiments, each guide assembly comprises a runner; and at least two setting members, which are hinged to the runner and can be set selectively to a work position contacting and astride the continuous elongated member, and to a rest position at a designated or given distance from the continuous elongated member. This enables sole movement of the setting members, and enables each setting member to be moved selectively into the work position or rest position, according to the conformation of the continuous elongated member.

In certain embodiments of the present disclosure, the frame comprises at least two supports for respectively supporting the guide assemblies and having respective arc-shaped guides; the method comprising the step of moving each guide assembly along a respective guide into a plurality of positions. This therefore permits fine adjustment of the guide assemblies along the respective guides.

Additional features and advantages are described in, and will be apparent from the following Detailed Description and the figures.

BRIEF DESCRIPTION OF THE DRAWINGS

A non-limiting embodiment of the present disclosure will be described by way of example with reference to the attached drawings, in which:

FIG. 8 shows a view in perspective, with parts removed for clarity, of the FIG. 1 machine; and FIG. 9 shows a view in perspective, with parts removed for clarity, of a component part of the FIG. 1 machine.

DETAILED DESCRIPTION

Figure 1:
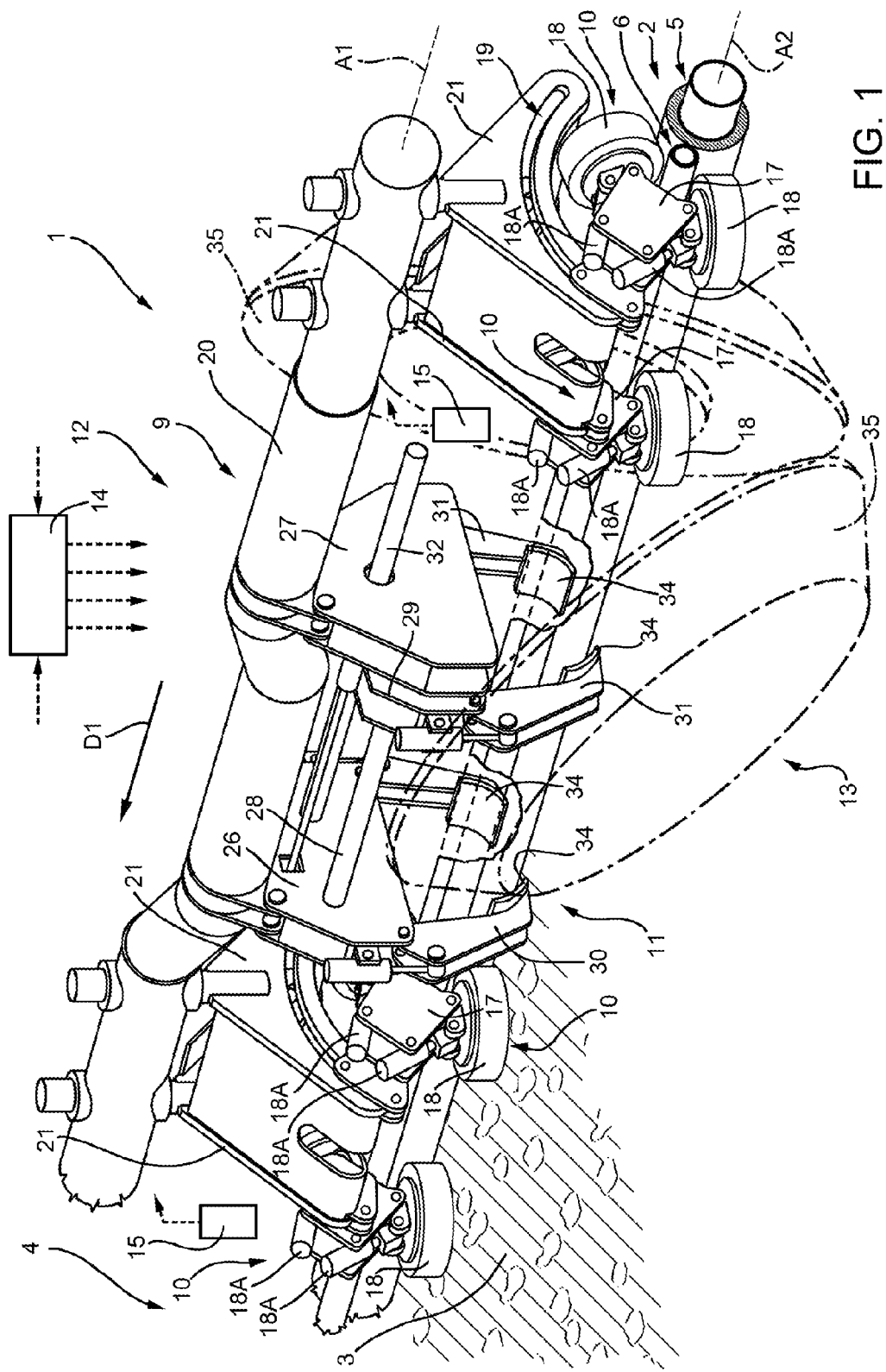
FIG. 1 shows a view in perspective, with parts removed for clarity, of a digging machine in accordance with the present disclosure and connected to a continuous elongated member laid on the bed of a body of water.

Referring now to the example embodiments of the present disclosure illustrated in FIGS. 1 to 9, number 1 in FIG. 1 indicates a digging machine connected to a continuous elongated member 2 lying on the bed 3 of a body of water 4.

For the purpose of the present description, the term 'body of water' is intended to mean any expanse of water, such as a sea, ocean, lake, etc., and the term 'bed' is intended to mean the concave layer of the earth's crust containing the body of water.

In the example shown, continuous elongated member 2 comprises a main pipeline 5 of axis A2; and an auxiliary or service pipeline 6 fitted to and smaller in diameter than main pipeline 5.

Figure 2:
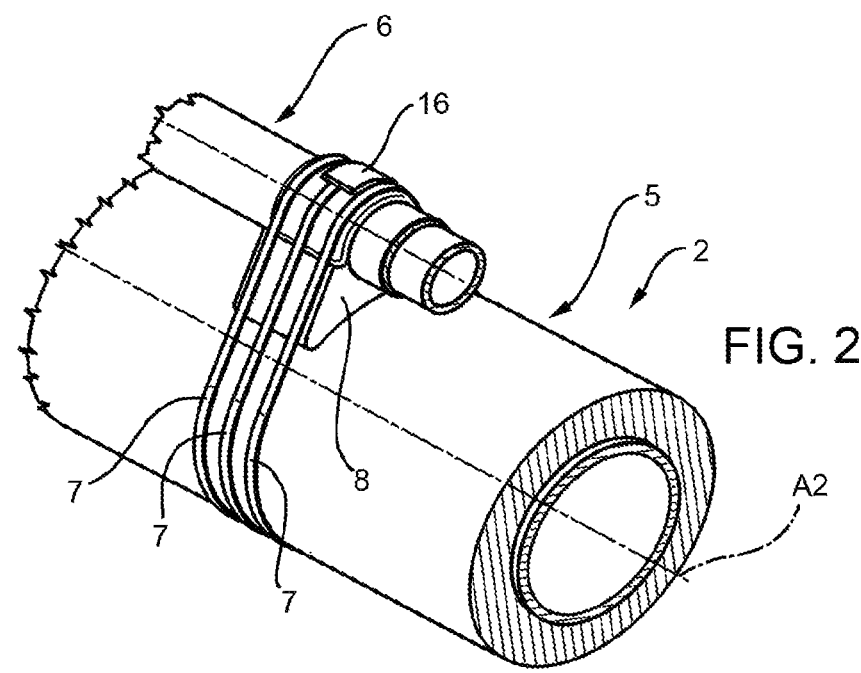
FIG. 2 shows a larger-scale view in perspective, with parts removed for clarity, of the continuous elongated member in FIG. 1.

With reference to FIG. 2, continuous elongated member 2 comprises straps 7 configured to bind auxiliary pipeline 6 to main pipeline 5. Straps 7 are arranged in groups spaced, possibly equally spaced, along continuous elongated member 2. In certain embodiments, continuous elongated member 2 comprises spacers 8 between main pipeline 5 and auxiliary pipeline 6. Straps 7 being unable to secure auxiliary pipeline 6 in a fixed position with respect to main pipeline 5 (i.e., to prevent auxiliary pipeline 6 from rotating about main pipeline 5), it is impossible to predict the position of auxiliary pipeline 6.

Digging machine 1 shown in FIG. 1 comprises a frame 9, four guide assemblies 10, a drive assembly 11, a control device 12, and a digging assembly 13. Frame 9 extends along an axis A1 substantially parallel to continuous elongated member 2, and supports in succession two guide assemblies 10, drive assembly 11, digging assembly 13, and two guide assemblies 10.

Control device 12 is shown schematically and comprises a control unit 14; and at least two sensors 15 configured to determine the configuration of continuous elongated member 2. In other words, control device 12 supplies reliable information concerning the instantaneous positions of auxiliary pipeline 6 and straps 7 (FIG. 2). As shown in FIG. 2, each group of straps 7 is, in the illustrated example embodiment, associated with a transponder 16 located in a designated or given position, and which serves to clearly indicate the position of auxiliary pipeline 6 and the bulk of straps 7 at a designated or given point. The spacing of groups of straps 7 is relatively constant and sufficient to interpolate and predict the position of auxiliary pipeline 6 between two consecutive groups of straps 7.

With reference to FIGS. 3 to 7, the position of each guide assembly 10 is adjustable with respect to frame 9 and continuous elongated member 2 according to the instantaneous conformation of continuous elongated member 2. In other words, control unit 14 controls adjustment of each guide assembly 10.

Construction-wise, each guide assembly 10 comprises a runner 17 connected slidably to frame 9; and two setting members 18—in the example shown, wheels—configured to be positioned contacting continuous elongated member 2.

Figure 3:
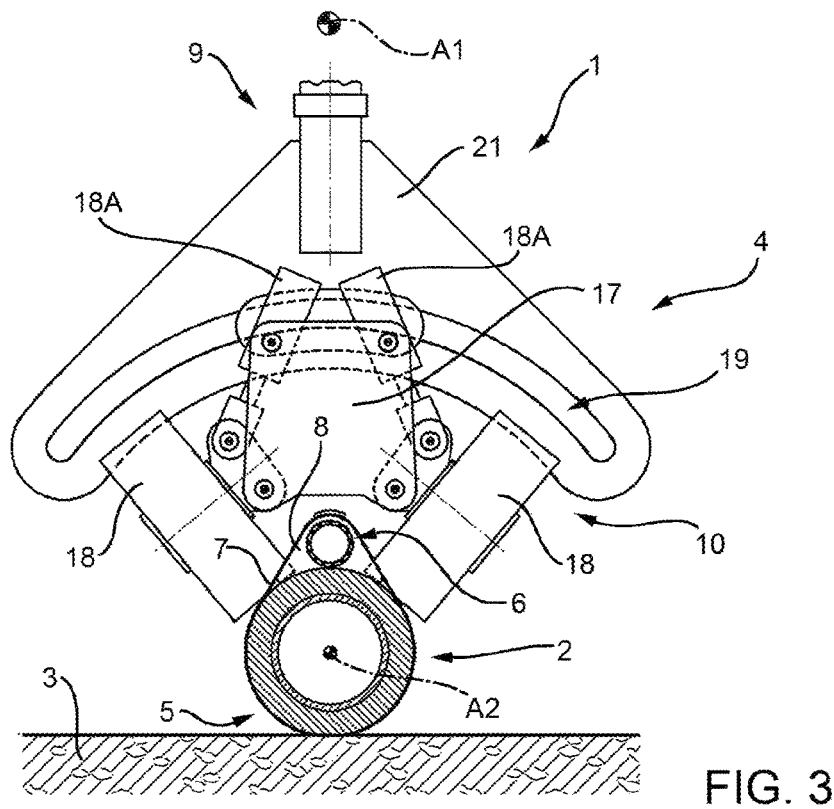
Figure 4:
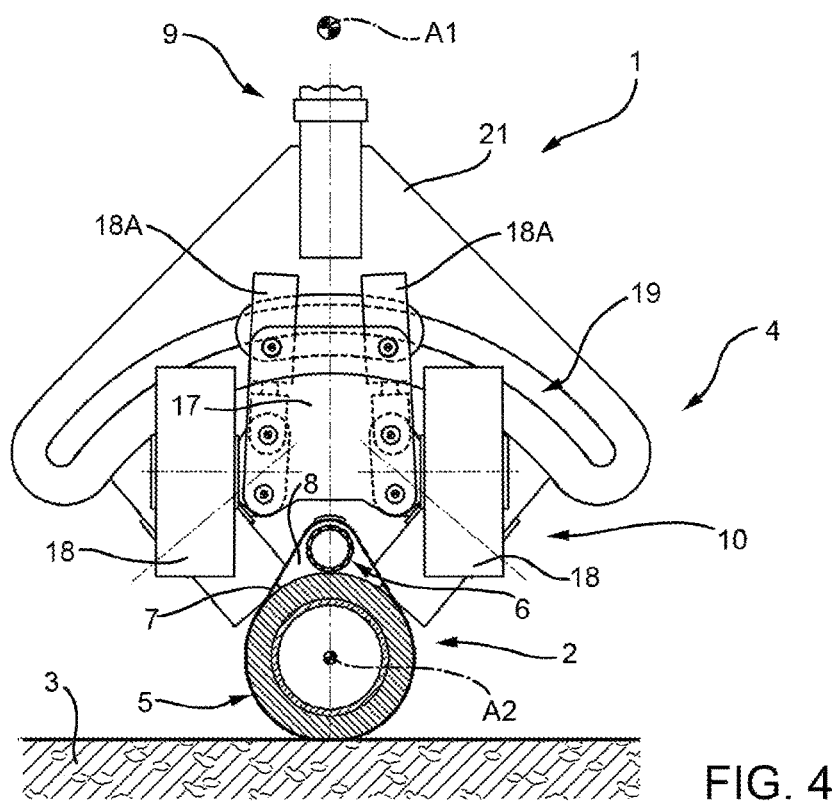

Each setting member 18 is hinged to runner 17 and movable between a work position shown in FIG. 3, and a rest position shown in FIG. 4. Each setting member 18 is operated independently of the other setting member 18 by a respective actuator 18A. In the FIG. 3 work position, setting members 18 are positioned contacting continuous elongated member 2—more specifically, only contacting main pipeline 5. In the work position, setting members 18 are tilted and converge towards axis A2 of main pipeline 5. In the FIG. 4 rest position, setting members 18 are raised a designated or given safety distance off continuous elongated member 2.

Setting members 18 are selectively set to the rest position to avoid interfering with straps 7, spacers 8 and auxiliary pipeline 6.

Figure 7:
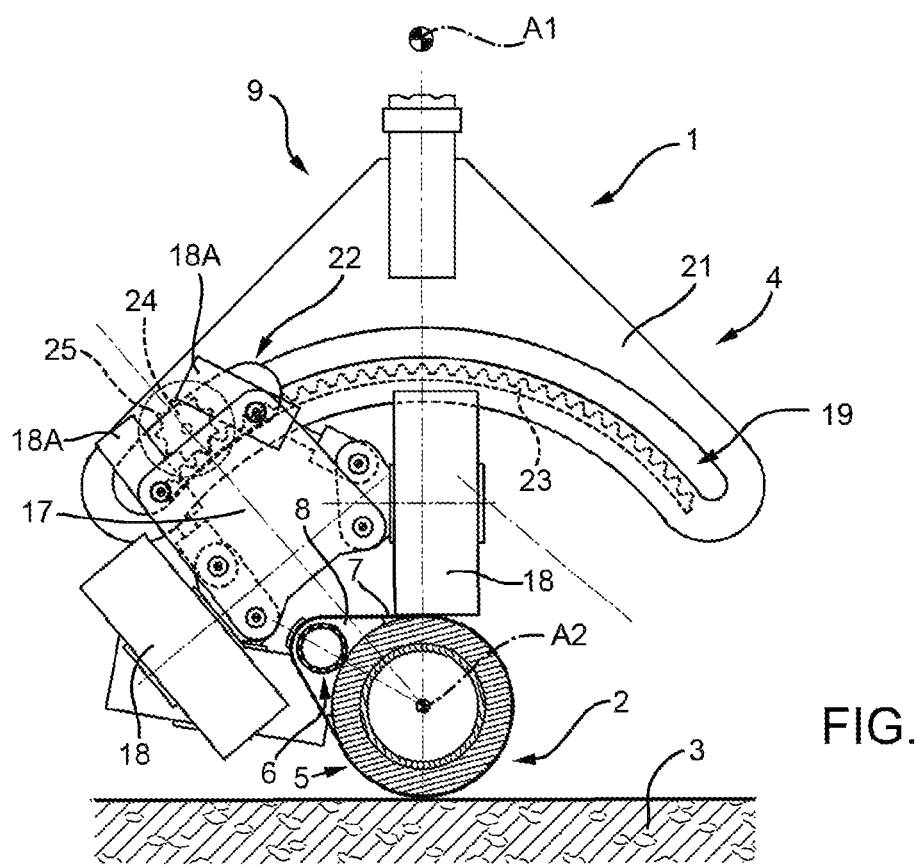
FIGS. 3, 4, 5, 6 and 7 show larger-scale elevations, with parts removed for clarity, of the FIG. 1 machine in different operating positions, according to the conformation of the continuous elongated member.
Figure 5:
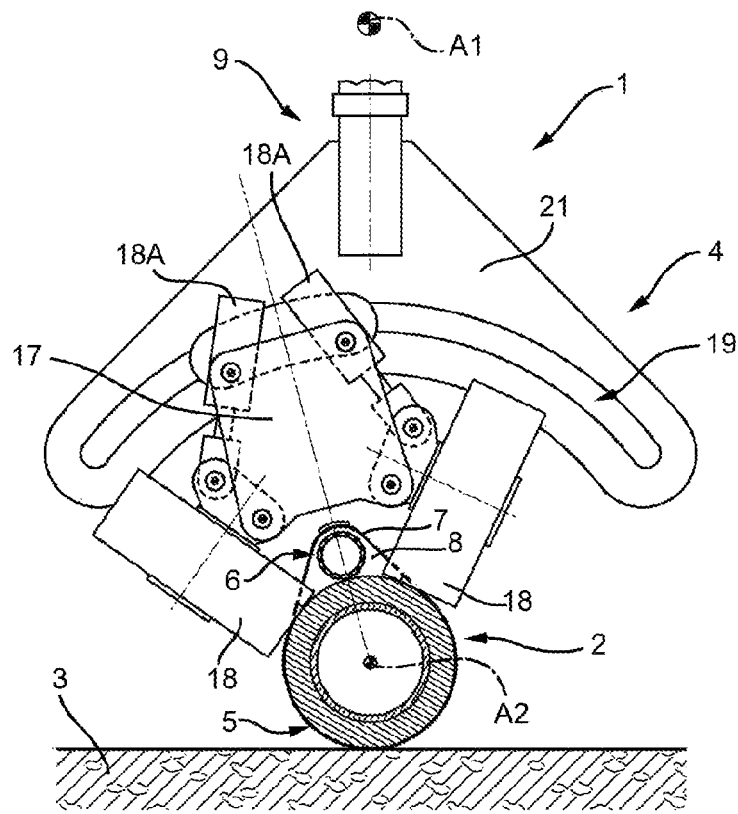
Figure 6:
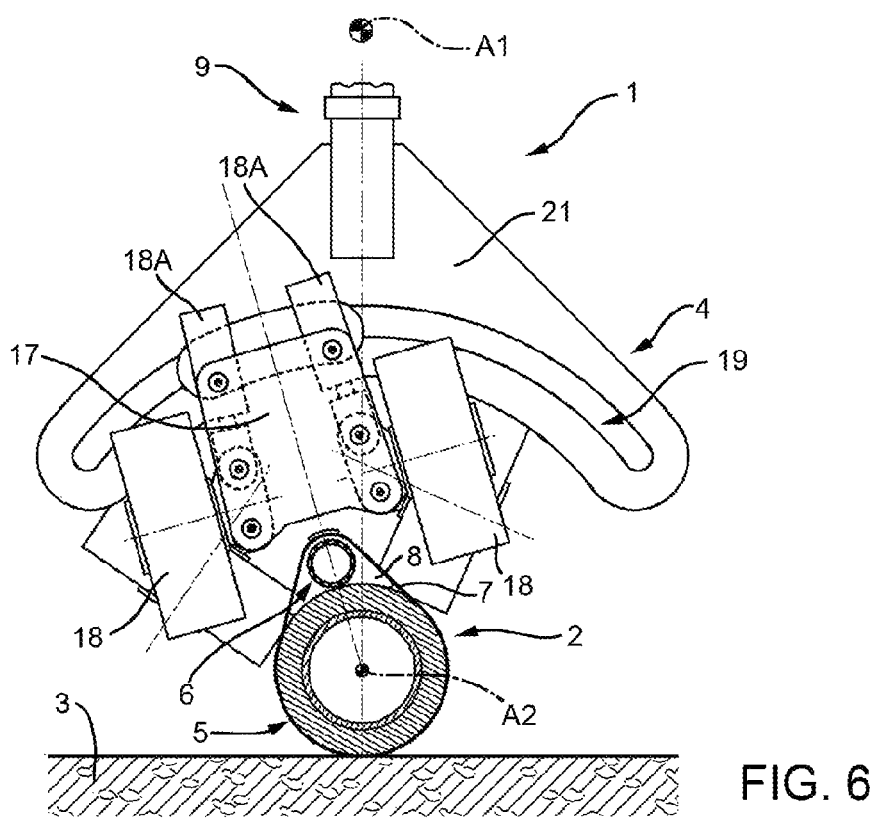

With reference to FIGS. 5, 6 and 7, each guide assembly 10 can rotate, such as along a designated or given arc, about continuous elongated member 2. More specifically, guide assembly 10 substantially rotates about axis A2 of main pipeline 5 and along a plane perpendicular to longitudinal axis A1 of frame 9. To move guide assembly this way, guide assembly 10 is connected movably to frame 9. In other words, runner 17 engages a guide 19 on frame 9.

With reference to FIG. 1, frame 9 comprises a longitudinal beam 20 parallel to longitudinal axis A1; and four supports 21 crosswise to longitudinal axis A1 and connected rigidly to beam 20. Each support 21 supports a respective guide assembly 10 in sliding manner.

With reference to FIG. 7, runner 17 is moved selectively along guide 19 by an actuating system 22 such as an actuating system comprising a rack 23 and pinion 24 mechanism operated by a rotary actuator 25.

In the example shown in the attached drawings, two adjacent guide assemblies 10 are operated by the same actuating system 22, and so perform the same movements. This solution is made possible by the adjacent guide assemblies 10 being located close together.

When setting members 18 are in the work position resting on main pipeline 5, guide 19—such as arc-shaped guide—is substantially centred about axis A2 of main pipeline 5.

Guide assembly 10 can thus be set to a plurality of work positions about continuous elongated member 2, depending on the conformation of continuous elongated member 2 and as shown in FIGS. 5 to 8. More specifically, FIG. 8 shows the position of guide assemblies 10 according to the position of auxiliary pipeline 6 around main pipeline 5.

With reference to FIG. 9, drive assembly 11 is a so-called 'push-pull' type, and comprises two opposite flanges 26, 27 connectable rigidly to beam 20 (FIG. 1); guides 28 connecting flanges 26 and 27; a carriage 29 movable selectively along guides 28; two clamps 30 hinged to flange 26; and two clamps 31 hinged to carriage 29. Carriage 29 is movable back and forth along guides 28, and is operated by an actuator 32.

Clamps 30 and 31 are each operated by a respective actuator 33, to move between a grip position (clamps 30) and a release position (clamps 31).

Clamps 30 and 31 each comprise a gripping portion 34.

With reference to FIG. 1, clamps 30 and 31 are configured to position gripping portions 34 on the underside of continuous elongated member 2, where auxiliary pipeline 6 is very unlikely to be.

Digging assembly 13 comprises two digging members 35 fitted to frame 9 and operated by actuators (not shown in the drawings). Digging members 35 are tilted so as to penetrate, break up, and remove a mass of bed 3 beneath continuous elongated member 2.

In actual use, digging machine 1 is moved in travelling direction D1 by drive assembly 11, and rests on continuous elongated member 2 utilizing guide assemblies 10. As digging machine moves along, digging assembly 13 breaks up and removes the mass of bed 3 beneath continuous elongated member 2 so as to sink elongated member.

Control device 12 determines the configuration of continuous elongated member 2, controls the orientation of guide assemblies 10 with respect to frame 9 and continuous elongated member 2, and selectively sets each setting member 10 to the work or rest position.

Clearly, changes may be made to the embodiment described of the present disclosure without, however, departing from the protective scope defined in the accompanying Claims. More specifically, the control device may be equipped with feelers, so there is no need for transponders; and the drive assembly may be a continuous type, in the form of a guide assembly with drive wheels. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A digging machine configured to bury a continuous elongated member in a bed of a body of water, the digging machine comprising:
   a frame extending along a longitudinal axis;
   at least two guide assemblies:
      (i) successively arranged along the longitudinal axis,
      (ii) fitted to the frame to move crosswise to the longitudinal axis, and
      (ii) configured to engage the continuous elongated member and move along the continuous elongated member; and
   a control device configured to adjust a position of each of the at least two guide assemblies with respect to the frame and the continuous elongated member according to a conformation of the continuous elongated member and a digging assembly.

2. The digging machine of claim 1, wherein each guide assembly is connected to the frame by a sliding coupling.

3. The digging machine of claim 2, wherein the sliding coupling is slidable along an arc-shaped trajectory.

4. The digging machine of claim 1, wherein each guide assembly is movable with respect to the frame along a respective plane perpendicular to the longitudinal axis.

5. The digging machine of claim 1, wherein the control device includes a control unit configured to cause each of the at least two guide assemblies to be set, with respect to the frame, to each of a plurality of positions about the continuous elongated member.

6. The digging machine of claim 1, wherein each guide assembly includes:
   a runner slidably fitted to the frame; and
   at least two setting members fitted to the runner and configured to be positioned contacting and astride the continuous elongated member.

7. The digging machine of claim 6, wherein each setting member is hinged to the runner and selectively movable to a work position and to a rest position.

8. The digging machine of claim 1, wherein the control device includes at least one sensor configured to detect at least one signal relating to the conformation of the continuous elongated member within a designated distance of at least one of the guide assemblies.

9. The digging machine of claim 8, wherein the control device includes at least two sensors configured to detect a plurality of signals relating to the conformation of the continuous elongated member within a designated distance of at least two respective guide assemblies.

10. The digging machine of claim 1, which includes a drive assembly between two guide assemblies.

11. The digging machine of claim 10, wherein the drive assembly is rigidly connected to the frame.

12. The digging machine of claim 10, wherein the drive assembly includes:
   a first pair of clamps configured to selectively clamp the continuous elongated member; and
   a second pair of clamps configured to selectively clamp the continuous elongated member, said second pair of clamps being movable along the longitudinal axis with respect to the frame;
   wherein one of the first pair of clamps and the second pairs of clamps are configured to engage the continuous elongated member when in use.

13. The digging machine of claim 10, wherein the drive assembly includes a plurality of gripping portions configured to grip an underside of the continuous elongated member.

14. The digging machine of claim 1, wherein the digging assembly including at least two digging members located on opposite sides of the frame and tilted to dig out a mass of the bed from beneath the continuous elongated member.

15. A method of advancing a digging machine configured to bury a continuous elongated member in a bed of a body of water, the method comprising:
   guiding the digging machine along the continuous elongated member laid on the bed of the body of water using at least two guide assemblies fitted to the continuous elongated member and successively arranged along a longitudinal axis of the digging machine;
   acquiring a plurality of signals relating to a conformation of the continuous elongated member, and
   adjusting a position of each of the at least two guide assemblies according to the conformation of the continuous elongated member, wherein said adjustment includes rotating each guide assembly about the continuous elongated member along a respective plane perpendicular to the longitudinal axis and according to the conformation of the continuous elongated member.

16. The method of claim 15, wherein the frame includes at least two supports configured to respectively support the guide assemblies and which includes moving each guide assembly along a respective guide into a plurality of positions.

17. The method of claim 16, wherein the at least two supports have respective arc-shaped guides.

18. The method of claim 15, which includes advancing the digging machine using a drive assembly located between the at least two guide assemblies.

19. The method of claim 15, wherein the digging machine includes a digging assembly, and which includes stabilizing and supporting the digging machine using the digging assembly.

20. A method of advancing a digging machine configured to bury a continuous elongated member in a bed of a body of water, the method comprising:
   guiding the digging machine along the continuous elongated member laid on the bed of the body of water using at least two guide assemblies fitted to the continuous elongated member and successively arranged along a longitudinal axis of the digging machine, wherein each guide assembly includes a runner and at least two setting members which are hinged to the runner and can be selectively set to a work position contacting and astride the continuous elongated member and to a rest position at a designated distance from the continuous elongated member;

acquiring a plurality of signals relating to a conformation of the continuous elongated member, and adjusting a position of each of the at least two guide assemblies according to the conformation of the continuous elongated member.

21. The method of claim 20, which includes selectively setting each setting member to the work position and the rest position according to the conformation of the continuous elongated member.

22. The method of claim 20, wherein adjusting the position of the guide assemblies includes setting each guide assembly to a guide assembly work position contacting the continuous elongated member and to a guide assembly rest position a designated distance from the continuous elongated member.

23. The method of claim 20, wherein adjusting the position of the at least two guide assemblies includes rotating each guide assembly about the continuous elongated member along a respective plane perpendicular to the longitudinal axis and according to the conformation of the continuous elongated member.

24. The method of claim 20, wherein the frame includes at least two supports configured to respectively support the guide assemblies and which includes moving each guide assembly along a respective guide into a plurality of positions.

25. The method of claim 24, wherein the at least two supports have respective arc-shaped guides.

26. The method of claim 20, which includes advancing the digging machine using a drive assembly located between the at least two guide assemblies.

27. The method of claim 20, wherein the digging machine includes a digging assembly, and which includes stabilizing and supporting the digging machine using the digging assembly.

* * * * *